(12) United States Patent
Dufils et al.

(10) Patent No.: US 11,618,845 B2
(45) Date of Patent: Apr. 4, 2023

(54) POLYMER DISPERSIONS FOR WAX INHIBITION DURING STIMULATION TREATMENT

(71) Applicant: RHODIA OPERATIONS, Aubervilliers (FR)

(72) Inventors: Pierre-Emmanuel Dufils, Paris (FR); David James Wilson, Coye La Foret (FR); Zongming Xiu, Katy, TX (US); Jia Zhou, The Woodlands, TX (US)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 17/290,966

(22) PCT Filed: Sep. 27, 2019

(86) PCT No.: PCT/EP2019/076189
§ 371 (c)(1),
(2) Date: May 3, 2021

(87) PCT Pub. No.: WO2020/088858
PCT Pub. Date: May 7, 2020

(65) Prior Publication Data
US 2022/0041917 A1 Feb. 10, 2022

Related U.S. Application Data

(60) Provisional application No. 62/754,686, filed on Nov. 2, 2018.

(51) Int. Cl.
*C09K 8/524* (2006.01)
*C09K 8/68* (2006.01)
(Continued)

(52) U.S. Cl.
CPC ............... *C09K 8/524* (2013.01); *C09K 8/68* (2013.01); *C09K 8/80* (2013.01); *C09K 8/885* (2013.01); *E21B 37/06* (2013.01); *C09K 2208/28* (2013.01)

(58) Field of Classification Search
None
See application file for complete search history.

(56) References Cited

U.S. PATENT DOCUMENTS

| 5,418,278 | A | 5/1995 | Ritter et al. |
| 9,714,376 | B2 | 7/2017 | Yang et al. |
| 2003/0191030 | A1 | 10/2003 | Blair et al. |
| 2005/0028976 | A1* | 2/2005 | Nguyen ................. C09K 8/536 428/407 |

(Continued)

FOREIGN PATENT DOCUMENTS

| CN | 101563377 A | 10/2009 |
| CN | 103459548 A | 12/2013 |

(Continued)

OTHER PUBLICATIONS

International Search Report issued in International Application No. PCT/EP2019/076189, dated Dec. 6, 2019 (4 pages).

(Continued)

*Primary Examiner* — Andrew Sue-Ako
(74) *Attorney, Agent, or Firm* — Osha Bergman Watanabe & Burton LLP

(57) ABSTRACT

The present invention relates to a method of inhibiting or control wax formation during stimulation treatment of a well. More specifically, the present invention proposes the use of aqueous polymer dispersions suitable as wax inhibitor compositions which are compatible with aqueous fracturing fluids.

21 Claims, 3 Drawing Sheets

(51) Int. Cl.
*C09K 8/80* (2006.01)
*C09K 8/88* (2006.01)
*E21B 37/06* (2006.01)

(56) References Cited

U.S. PATENT DOCUMENTS

| | | | |
|---|---|---|---|
| 2005/0085588 A1* | 4/2005 | Baloche | C08F 2/24 |
| | | | 524/827 |
| 2014/0341957 A1 | 11/2014 | Yang et al. | |
| 2014/0378617 A1 | 12/2014 | Wilson et al. | |
| 2015/0096751 A1* | 4/2015 | Shen | C09K 8/92 |
| | | | 507/224 |
| 2017/0096516 A1* | 4/2017 | Harrisson | C08F 293/00 |
| 2020/0102407 A1* | 4/2020 | Dufils | C10L 10/16 |

FOREIGN PATENT DOCUMENTS

| | | |
|---|---|---|
| CN | 104011101 A | 8/2014 |
| EP | 161926 A2 | 11/1985 |
| EP | 359061 A1 | 3/1990 |
| EP | 448166 A2 | 9/1991 |
| EP | 3412691 A1 | 12/2018 |
| FR | 2880821 A1 | 7/2006 |
| RU | 2363719 C2 | 8/2009 |
| WO | 9833846 A1 | 8/1998 |
| WO | 9851731 A1 | 11/1998 |
| WO | 03014170 A1 | 2/2003 |
| WO | 2006075109 A1 | 7/2006 |
| WO | 2013060741 A1 | 5/2013 |

OTHER PUBLICATIONS

Written Opinion issued in International Application No. PCT/EP2019/076189, dated Dec. 6, 2019 (7 pages).
Office Action issued in corresponding Chinese Application No. 201980087856.8; dated Jun. 10, 2022 (12 pages).
Office Action issued in Russian Federation Application No. 2021113372/03(028369); dated Jan. 31, 2023 (7 pages).

* cited by examiner

POLYMER DISPERSIONS FOR WAX INHIBITION DURING STIMULATION TREATMENT

CROSS-REFERENCE TO RELATED APPLICATION

The present application is a national stage of PCT Application No. PCT/EP2019/076189 filed on Nov. 02, 2018, which is herein incorporated by reference.

SUMMARY

The present invention relates to a method of inhibiting or control wax formation during stimulation treatment of a well. More specifically, the present invention proposes the use of aqueous polymer dispersions suitable as wax inhibitor compositions which are compatible with aqueous fracturing fluids.

BACKGROUND

In a hydraulic fracturing treatment, a fracturing fluid is pumped through a wellbore and into a subterranean formation producing zone at a rate and pressure such that one or more fractures are formed or extended into the zone. During the fracturing operation, wax and paraffin deposit may form at the fracture skin or pores due to the introduction of a cold fluid to the formation. The as-formed wax deposit may block the pore and cause decreasing oil production. Especially, for paraffin-rich reservoirs, such as shale oil, damage caused by wax deposition at the fracture skin can cause slow or hard to clean up wellbores, or failure to achieve predicted maximum recovery.

One of the wax deposit control method is the application of wax inhibitors which are commonly dissolved in toxic and flammable organic solvents. However, these solvent-based dispersions are not compatible with the water-based fracturing fluids.

In the past years, several water-based wax inhibitors were developed by dispersing the hydrophobic polymer into water phase with the help of wetting agents and then incorporated into an absorbing material. However, this wax inhibitor itself is still a hydrophobic polymer, making it challenging to dissolve and/or to be released in the produced oil/water stream. Besides, its large particle size (~μm) could cause fluid phase separation once added into fracturing fluid.

Other types of pour point depressant (PPD) polymers and wax inhibitors such as aqueous dispersions of polymers are known in the art. As examples, SHELL in EP 448,166, then WO 98/51731 and British Petroleum in WO 98/33846 discloses the preparation of a dispersion in water of a mixture of n-alkyl acrylate copolymers in the presence of surfactant(s) and/or surfactant polymers with a high-pressure homogenizer. Such a preparation process especially exhibits the drawback of being not very economical at industrial scale because it requires two preparation stages as well as the use of a specific dispersion equipment.

U.S. Pat. No. 5,418,278 or EP 359,061 of HENKEL proposes emulsions that contain n-alkyl acrylate copolymers and unsaturated ethylene derivatives of carboxylic acid or anhydride in the presence of a surfactant. The major drawback of such a solution resides in the fact that to be stable, the emulsion should contain a large amount of acid or anhydride, which not only can interfere with the overall performance of the product but also limits its use with particular crude oils.

Latex dispersions have also been described in WO 03/014170 are prepared by emulsion copolymerization. This kind of formulation tends to exhibit an unsatisfactory stability of the dispersions over weeks to months for storage and in case of temperature variations.

A goal of the present invention is to propose a method allowing inhibition of wax formation, which can be easily used in stimulation treatment, notably during hydraulic fracturing operations, and which do not exhibit the drawback of the above mentioned compositions, notably due to the presence of toxic and flammable solvents, and exhibiting a suitable stability over time.

DETAILED DESCRIPTION

Figure 1:
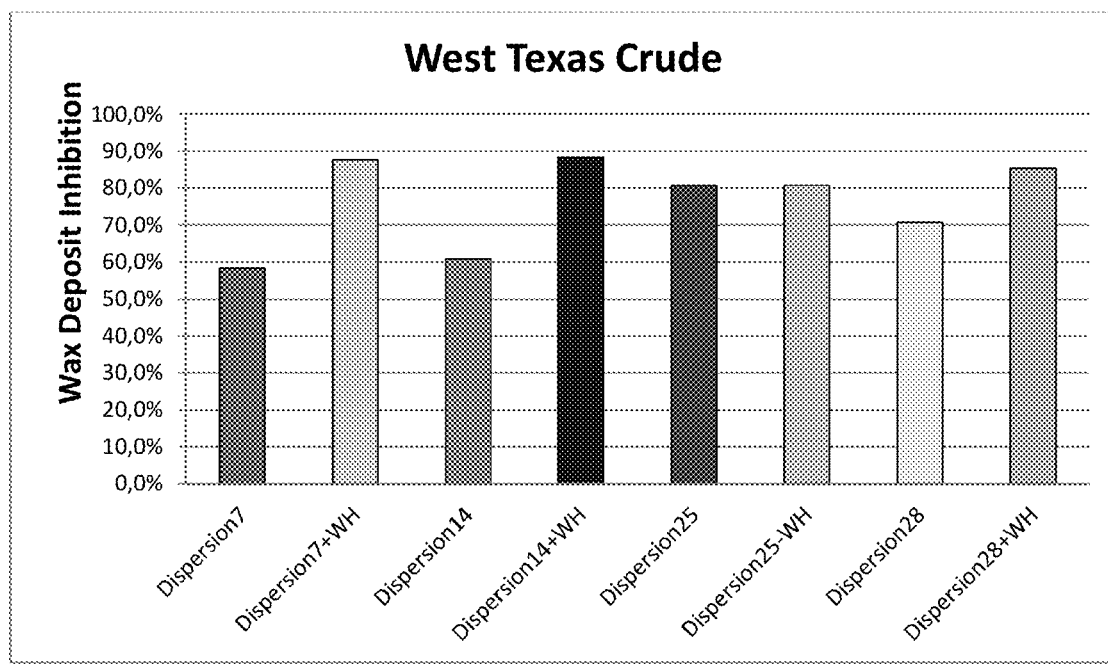
FIG. 1 shows the impact of a certain friction reducer on PPD dispersion in wax inhibition performance.

According to a first aspect, a subject of the present invention is a process for stimulation treatment, typically fracturing, of a subterranean formation for recovering oil, said process including the introduction into said formation of an aqueous polymer dispersion comprising at least one polymer (P), whose monomer units include at least one monomer (m) of n-alkyl(meth)acrylate, with n being of at least 6, typically, of more than 8.

According to the present invention, n-alkyl (meth)acrylate or alkyl (meth)acrylate of "Cn" means an alkyl (meth)acrylate with the alkyl group containing n carbon atoms. For example, "n-alkyl(meth)acrylate with n being of 8" or "alkyl (meth)acrylate of C8" means an alkyl (meth)acrylate with the alkyl group containing 8 carbon atoms.

According to one embodiment, the monomer (m) is chosen from an alkyl (meth)acrylate of at least C8, for example of at least C12, e.g. of at least C14. Besides, the at least one monomer (m) is chosen from an alkyl (meth) acrylate of less than C36, for example of less than C30, e.g. of less than C24.

According to one specific embodiment, the monomer (m) is chosen from an alkyl (meth)acrylate between C8 and C24 (for example, between C16 and C22), and optionally in mixture with monomers of less than C16. For example, the at least one monomer is a mixture of an alkyl (meth)acrylate between C18 and C25 with an alkyl (meth)acrylate between C8 and C18.

The monomer (m) is for example chosen from iso-octyl (meth)acrylate, iso-bornyl (meth)acrylate, lauryl (meth)acrylate, octadecyl (meth)acrylate, 2-ethyl hexyl (meth)acrylate, C22 alkyl acrylate and/or a mixture thereof.

According to the present description, the polymer (P) typically comprises more than 50%, typically more than 60%, e.g. more than 70% and less or equal to 100% by weight of the monomer (m).

According to one specific embodiment, the polymer (P) further comprises monomers units of one or more co-monomers (m') selected from n-alkyl(meth)acrylates with n less than or equal to 6, for example, 2-ethyl hexyl(meth) acrylate.

These monomers (m') may be chosen depending on the specific use of the polymer dispersion of the invention. Typically, the ratio by weight (m)/(m') of the monomer(s) (m) to the co-monomer(s) (m') present in the polymer dispersion is at least 50:50, for example at least 55:45, e.g. at least 60:40 or 75:25 in some cases.

According to the invention, the monomers (m) can be easily adapted to inhibit the paraffin waxes of variable molecular weight. For example, for a high molecular weight paraffin wax, an alkyl (meth)acrylate with long chain of alkyl can be chosen.

According to a specific embodiment, the polymer (P) may further comprise monomer units of one or more hydrophilic monomers or amphiphilic (mA$_h$), which are soluble in the aqueous polymer dispersion.

Typically, the polymer (P) comprises from 0 to 50%, preferably from 2 to 30%, e.g. 20 to 30% by weight of the one or more hydrophilic monomers or amphiphilic (mAh).

These hydrophilic or amphiphilic monomers (mAh) are typically having a water solubility of more than 5% by weight at 20° C.

Typically, the monomers (mA$_h$) can be selected from:
unsaturated carboxylic acid amides, such as acrylamide, methacrylamide, N-methylolacrylamide or -methacrylamide, N-alkyl(meth)acrylamides, N,N-dimethyl(meth)acrylamide, N,N-dimethylaminomethyl(meth)acrylamide, 2-(N, N-dimethylamino)ethyl(meth)acrylamide, 3-(N,N-dimethylamino)propyl(meth)acrylamide, or 4-(N, N-dimethylamino)butyl(meth)acrylamide,
vinylamine amides, in particular vinylformamide, vinylacetamide, N-vinylpyrrolidone and N-vinylcaprolactam,
α,β monoethylenically unsaturated amino esters, such as 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate, or 2-(diethylamino)ethyl methacrylate, vinylpyridines,
vinylimidazolines,
ethylenically unsaturated monocarboxylic and dicarboxylic acids, such as acrylic acid, methacrylic acid, itaconic acid, maleic acid or fumaric acid,
monomers carrying at least one vinyl phosphonate function, such as vinylphosphonic acid, vinylphosphonic acid dimethyl ester, vinylphosphonic acid bis(2-chloroethyl) ester, vinylidenediphosphonic acid, vinylidenediphosphonic acid tetraisopropyl ester or alpha-styrenephosphonic acid, or mixtures thereof, mixtures of two or more of these monomers,
ammoniumacryloyl or acryloyloxy monomers,
trimethylammoniumpropylmethacrylate salts, in particular the chloride,
trimethylammoniumethylacrylamide or -methacrylamide chloride or bromide,
trimethylammoniumbutylacrylamide or -methacrylamide methylsulfate,
trimethylammoniumpropylmethacrylamide methylsulfate (MAPTA MeS),
(3-methacrylamidopropyl)trimethylammonium chloride (MAPTAC),
(3-acrylamidopropyl)trimethylammonium chloride or methylsulfate (APTAC or APTA MeS),
alkyl-polyalkoxylated (meth)acrylates that comprise one linear or branched (C5-C40)alkyl-polyethoxylated group, more typically (C10-C22)alkyl-polyethoxylated group per molecule, such as decyl-polyethoxylated (meth)acrylates, tridecyl-polyethoxylated (meth)acrylates, myristyl-polyethoxylated (meth)acrylates, cetyl-polyethoxylated (meth)acrylates, stearyl-polyethoxylated (methyl)acrylates, eicosyl-polyethoxylated (meth)acrylates, behenyl-polyethoxylated (meth)acrylates, even more typically decyl-polyethoxylated methacrylates, tridecyl-polyethoxylated methacrylates, myristyl-polyethoxylated methacrylates, cetyl-polyethoxylated methacrylates, stearyl-polyethoxylated methylacrylates, eicosyl-polyethoxylated methacrylates, behenyl-polyethoxylated methacrylates, and mixtures thereof,
methacryloyloxyethyltrimethylammonium chloride or methylsulfate,
acryloyloxyethyltrimethylammonium (ADAMQUAT) salts, such as acryloyloxyethyltrimethylammonium chloride or acryloyloxyethyltrimethylammonium methylsulfate (ADAMQUAT Cl or ADAMQUAT MeS),
methyldiethylammoniumethyl acrylate methylsulfate (ADAEQUAT MeS),
benzyldimethylammoniumethyle acrylate chloride or methylsulfate (ADAMQUAT BZ 80),
1-ethyl 2-vinylpyridinium bromide, chloride or methylsulfate or 1-ethyl 4-vinylpyridinium bromide, chloride or methylsulfate,
N,N-dialkyldiallylamine monomers, such as N,N-dimethyldiallylammonium chloride (DADMAC),
dimethylaminopropylmethacrylamide, N-(3-chloro-2-hydroxypropyl)trimethylammonium chloride (DIQUAT chloride),
dimethylaminopropylmethacrylamide, N-(3-methylsulfate-2-hydroxypropyl)-trimethylammonium methylsulfate (DIQUAT methylsulfate),
the monomer of formula

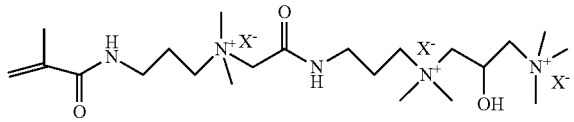

so where X$^-$ is an anion, preferably chloride or methylsulfate,

Alternatively, the monomers (mA$_h$) may comprise monomers selected from:
esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol(meth)acrylates;
α,β-ethylenically unsaturated monocarboxylic acid amides and the N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)acrylamide, and metholylacrylamide (acrylamide and N,N-dimethyl(meth)acrylamide prove to be in particular advantageous);
N-vinyllactams and derivatives thereof, for example N-vinylpyrrolidone and N-vinylpiperidone;

open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;

esters of α,β-ethylenically unsaturated monocarboxylic and dicarboxylic acids with aminoalcohols, for example N,N-dimethylaminomethyl(meth)acrylate, N,N-dimethylaminoethyl(meth)acrylate, N, N-diethylaminoethyl acrylate, and N,N-dimethylaminopropyl (meth)acrylate;

amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl] methacrylamide, N-[4-(dimethylamino)butyl] acrylamide and N-[4-(dimethylamino)butyl] methacrylamide;

ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, methallylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid (AMPS), vinylphosphonic acid, α-methylvinylphosphonic acid and allylphosphonic acid and/or their salts;

N-diallylamines, N,N-diallyl-N-alkylamines, acid-addition salts thereof and quaternization products thereof, the alkyl used here preferentially being C1-C3-alkyl; N, N-diallyl-N-methylamine and N, N-diallyl-N, N-dimethylammonium compounds, for example the chlorides and bromides;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;

sulfobetaines; and mixtures and combinations of two or more of the above-mentioned monomers.

According to a preferred embodiment of the instant invention, the monomer ($mA_h$) is selected from:

ethylenically unsaturated monocarboxylic and dicarboxylic acids, such as acrylic acid, methacrylic acid, itaconic acid, maleic acid or fumaric acid, unsaturated carboxylic acid amides, such as acrylamide, methacrylamide, N-methylolacrylamide or -methacrylamide, N-alkyl(meth)acrylamides, N,N-dimethyl (meth)acrylamide, N,N-dimethylaminomethyl(meth) acrylamide, 2-(N,N-dimethylamino)ethyl(meth) acrylamide, 3-(N,N-dimethylamino)propyl(meth) acrylamide, or 4-(N,N-dimethylamino)butyl(meth) acrylamide, vinylamine amides, in particular vinylformamide, vinylacetamide, N-vinylpyrrolidone and N-vinylcaprolactam.

According to the present description, the term "(meth)acrylate" refers collectively and alternatively to the acrylate and methacrylate and the term "(meth)acrylamide" refers collectively and alternatively to the acrylamide and methacrylamide, so that, for example, "butyl (meth)acrylate" means butyl acrylate and/or butyl methacrylate.

According to another specific embodiment, the polymer (P) further comprises some units coming from monomers hydrophobic ($mA_H$) in nature, in addition to the hydrophilic or amphiphilic monomers ($mA_h$). In some cases, the presence of hydrophobic monomers ($mA_H$) can be useful to adjust the solubility of the dispersion in the solvent or the mixture of solvents as described here-after.

Said hydrophobic monomers ($mA_H$) including for example styrene or its derivatives, butadiene, ethylene, chloroprene, (meth)acrylic esters, vinyl esters of a carboxylic acid, for instance vinyl acetate, vinyl versatate or vinyl propionate, and vinyl nitriles.

The term "(meth)acrylic esters" denotes esters of acrylic acid and of methacrylic acid with hydrogenated or fluorinated $C_1$-$C_{12}$ and preferably $C_1$-$C_8$ alcohols. Among the compounds of this type that may be mentioned are: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate, isobutyl methacrylate, polyethyleneglycol acrylate or methacrylate with 4 to 50 units of ethylene glycol or methoxypolyethyleneglycol acrylate or methacrylate with 4 to 50 units of ethylene glycol.

The vinyl nitriles more particularly include those containing from 3 to 12 carbon atoms, such as, in particular, acrylonitrile and methacrylonitrile.

It should be noted that the styrene may be totally or partially replaced with derivatives such as α-methylstyrene or vinyltoluene.

Other ethylenically unsaturated monomers ($mA_H$) that may be used, alone or as mixtures, or that are copolymerizable with the above monomers are especially:

vinyl halides, vinylamine amides, especially vinylformamide or vinylacetamide,

N'-alkyl(meth)acylamides of at least C8, N',N'-dialkyl (meth)acrylamides of at least C6.

Typically, the polymer dispersion of the invention comprises form 1 to 80%, preferably from 5 to 70%, more preferably from 10 to 60%, e.g. 20 to 50% by weight of the polymer (P).

According to one embodiment of the invention, the dispersion comprises an aqueous dispersing phase ("aqueous medium"), the water being present in said aqueous medium of the dispersion typically in an amount of at least 50%, preferably at least 60%, even 100% by weight based on the total weight of the aqueous medium.

According to specific embodiment, the polymer dispersion may comprise a water-miscible solvent or a mixture of solvents. Typically, the dispersion comprises from 0.1 to 90%, e.g. 5 to 80%, preferably more than 30% and less than 70% by weight of a water-miscible solvent or a mixture of solvents, based on the total weight of the aqueous medium of the dispersion.

According to a specific embodiment, the solvent or the mixture of solvents are selected from saturated or unsaturated monohydric alcohols and polyhydric alcohols, as well as alkylether diols such as, for example, methanol, ethanol, isopropanol, cetyl alcohol, benzyl alcohol, oleyl alcohol, 2-butoxyethanol, glycol, such as, for example, ethylene glycol, polyethylene glycol, propylene glycol, hexylene glycol, ethylene glycol monoethyl ether, ethylene glycol mono n-butyl ether (EGMBE), propylene glycol monoethyl or and diethylene glycol monomethyl ether.

According to one embodiment of the invention, the water-miscible solvent or the mixture of solvents is preferably chosen from glycol, for example, monoethylene glycol, propylene glycol and/or tripropylene glycol, and/or ethylene glycol mono n-butyl ether (EGMBE).

According to one specific embodiment of the invention, the polymer dispersion further comprises from 0 to 10%, preferably 0.5 to 8%, e.g. 1 to 5% by weight of at least one surfactant.

According to a specific embodiment, the surfactants may be chosen from ionic, non-ionic and amphoteric surfactants, such as fatty alcohols or alkylphenol sulfates or sulfonates, alkylbenzene sulfonates, for example, dodecylbenzene sulfonate, sulfosuccinates, quaternary ammonium salts, dimethyidialkylammonium chloride or ethylated fatty alcohol. Some other surfactants can be contemplated, such as polyvinyl alcohols or poly N-vinyl pyrrolidone.

Preferably, the surfactants are selected from dodecylbenzene sulfonate, sulfosuccinates, quaternary ammonium salts or ethylated fatty alcohol.

According to another aspect, a subject of the present invention concerns the use, in said process, of the polymer dispersion described here-above for inhibiting wax formation.

The polymer dispersions of the instant invention can be typically used as environmentally friendly wax inhibitor compositions dispersed in a medium free of flammable solvents.

One of the advantages of these polymer dispersion is that they have high solids loading, i.e. 40%, 50% or more.

The polymer dispersion can be used as such or be diluted with any compatible solvent before use.

The polymer dispersion of the invention may be used in any fluids used for the stimulation treatment of subterranean formation, especially oil well or oil wells under formation, wherein it is desired to inhibit the formation of wax, control the formation of wax. For instance, the dispersions may be mixed with any formulation used for fracturing, including notably brine, acidizing compositions, etc., the mixture being used as a fracturing fluid.

The polymer dispersion of the present invention, as being an amphiphilic polymer, is easy to be prepared and to be mixed with the water-based stimulation treatment fluids, especially water-based fracturing fluids, to control the wax inhibition.

According to the present invention, the polymer dispersions may be used as such, i.e. in form of a liquid carrier; or they may be incorporated into a solid particle, typically an adsorbent material, before introduction into the subterranean formation.

Hence, an advantage of the present invention is that the aqueous dispersion polymer of the invention can be easily formulated with stimulation treatment fluids and/or delivered via the solid particles described here-after.

According to a preferred embodiment of the invention, the polymer dispersion, with or without being incorporated into a solid particle, is mixed with into the oil well.

Generally, a fracturing fluid composed mainly of water is prepared at the surface before being pumped downhole in order to induce fractures in the formation of interest.

The fracturing fluids may also comprise additives which are selected for their capability to improve the results of the stimulation operation and the productivity of the well. The additives typically include gels, friction reducers, cross-linkers, breakers, clay control agents, buffers, biocides and surfactants.

An advantage of the aqueous polymer dispersion of the invention is that it can be easily blended within the fracturing fluids and is compatible with the water-based fracturing fluids with very minimal to no risk of any adverse effect on the fluids and their function.

According to a specific embodiment of the present invention, the fracturing fluid comprises a friction reducer.

This embodiment is especially interesting, since it has been observed an improvement of the friction reducer performance in the presence of the polymer dispersion of the invention. At the same time, the presence of the friction reducer does not affect negatively the performance of wax inhibition of the polymer dispersion and an improvement of the wax inhibition effect has even been observed when compared to that without the presence of friction reducer.

Generally, any long chain polymer can be used as friction reducer in the present description, such as polysaccharides (native and derivatized guar, cellulose and cellulose derivatives), a poly(alkylene glycol), a poly(alcohol) made by the hydrolysis of polyvinyl acetate), poly(vinyl pyrrolidone), a chitin, a chitosan, a protein, a poly(amino acid), a poly (alkylene oxide), a polyacrylamide, polyacrylic acid, modified polyacrylamide, a poly(acid), a polyol, any derivative, copolymer, or combination.

Preferably, the friction reducer may be a polymer composed of from about 95 to about 50 mol % of one or more nonionic monomers and from about 95 to about 50 mol % of one or more cationic monomers selected from the group consisting of dialkylaminoalkyl acrylates and methacrylates and their quaternary or acid salts.

In another aspect, the cationic monomers are selected from dimethylaminoethyl acrylate methyl chloride quaternary salt and dimethylaminoethyl acrylate benzyl chloride quaternary salt.

In another aspect, the polymer is acrylamide/dimethylaminoethyl acrylate methyl chloride quaternary salt/dimethylaminoethyl acrylate benzyl chloride quaternary salt terpolymer.

In another aspect, the polymer is acrylamide/dimethylaminoethyl acrylate methyl chloride quaternary salt copolymer.

In another aspect, the polymer is composed of from about 95 to about 50 mol % of one or more nonionic monomers and from about 95 to about 50 mol % of one or more anionic monomers selected from the group consisting of acrylic acid, methacrylic acid and 2-acrylamido-2-methylpropanesulfonic acid and the salts thereof.

In a preferred aspect, the polymer is acrylamide/acrylic acid sodium salt copolymer.

In another preferred aspect, the polymer is acrylamide/acrylic acid copolymer.

In another preferred aspect, the polymer is acrylamide/acrylic acid/acrylic acid sodium salt terpolymer.

In another preferred aspect, the polymer has a molecular weight of at least 1,000,000 g/mol.

In another preferred aspect, the polymer has a molecular weight of at least 5,000,000 g/mol.

According to a preferred embodiment of the invention, the friction reducer is a polyacrylamide based (PAM-based) (co)polymer.

For example, a suitable friction reducer may be FR-WH®, FR-HS® from Solvay; Alcomer® 120L, Alcomer® 788 or Alcomer® 889 from BASF or ASP900 from Nalco.

According to a specific embodiment of the present invention, the polymer dispersion is impregnated into a solid particle, preferably a porous material, typically an adsorbent/or absorbent or both material before introduction into the subterranean formation.

The adsorbent material may advantageously be porous proppant particle.

The porous proppant particles may be sufficiently strong to be used on their own, though they may be used in conjunction with proppant particles of non-porous material such as sand. Once injected into the formation the polymer dispersion contained within the porous particles gradually leaches out into the well fluids over a period which is preferably several months and even for several years.

The adsorbent materials are typically insoluble in the present description. Because they are insoluble they continue to act as proppant particles even after all the chemical treatment agent has leached out.

In particular the proppant particles might be porous beads of silica- or alumina-based material of size in the range 0.3 mm to 5 mm, preferably between 0.5 and 2 mm, for example about 0.5 mm or about 1 mm, which might be made by a number of production routes for example a sol-gel process, electrofusion, spray-drying, pelletisation and chemical and/or thermal modification of proprietary products. They may have a porosity in the range 5% to 30%, for example about 12% or 18%. They are preferably of spherical shape. The porosity of the proppant can be typically measured by mercury intrusion porosimetry, for example using the Micromeritics Autopore IV 9500 supplied by Particles Technology Labs (Chicago, Ill.).

The porous particles may be other water-insoluble adsorbents. Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents.

Particular preferred are diatomaceous earth.

Further useful as adsorbents are clays such as natural clays, preferably those having a relatively large negatively charged surface and a much smaller surface that is positively charged. Other examples of such high surface area materials include such clays as bentonite, illite, montmorillonite and synthetic clays.

The adsorbent material suitable to be used in the present description may be any of various kinds of commercially available high surface area materials having the affinity to adsorb the desired wax inhibitor. Typically, the surface area of the adsorbent is between from about 1 m$^2$/g to about 100 m$^2$/g.

The weight ratio of dispersion to water-insoluble adsorbent is generally between from about 90:10 to about 10:90.

The polymer dispersion can be incorporated into the solid particles described here-above before injection into a well. It can be blended with the stimulation fluids, typically fracturing fluids, or be injected before or after the injection of the stimulation fluids, for example fracturing fluids.

The dispersion is incorporated into the solid particles in amounts that nevertheless maintained a free-flowing solid product. The absorption was done by warming the fluids and adding them to the porous solid particles under vacuum. They are often followed by a drying step. In some cases, the particles are further pound to reach a desirable size.

Typically, it can be easily mixed into the stimulation fluids, typically fracturing fluids, just before use.

Hence, the present invention provides an efficient wax inhibition and the compositions used to this end which can be easily prepared in advance before the final use, and are easy to transport and easy to store.

According to a preferred embodiment, the polymer dispersion is incorporated into solid particles and blended within the fracturing fluids, drying or not, before being introduced into a well.

The polymer dispersion of the present invention provides a good releasing profile in the produced water/oil stream due to its compatibility with the water-based stimulation treatment fluids, typically fracturing fluids. A continuous supply of inhibitor may therefore be introduced into a target area.

The polymer dispersion according to the present invention can be typically prepared by a process comprising a step (E) of free radical polymerization in an aqueous medium (M), in the presence of:

(1) at least a pre-polymer (p0) soluble in the medium (M) of formula (I):

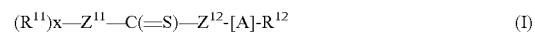

$$(R^{11})_x—Z^{11}—C(=S)—Z^{12}-[A]-R^{12} \quad (I)$$

wherein:

$Z^{11}$ represents C, N, O, S or P, $Z^{12}$ represents S or P, $R^{11}$ and $R^{12}$, which may be identical or different, represent:

an optionally substituted alkyl, acyl, aryl, alkene or alkyne group (i), or a saturated or unsaturated, optionally substituted or aromatic carbon-based ring (ii), or a saturated or unsaturated, optionally substituted heterocycle (iii), these groups and rings (i), (ii) and (iii) possibly being substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), R representing an alkyl or aryl group, x corresponds to the valency of $Z^{11}$, or alternatively x is 0, in which case $Z^{11}$ represents a phenyl, alkene or alkyne radical, optionally substituted with an optionally substituted alkyl; acyl; aryl; alkene or alkyne group; an optionally substituted, saturated, unsaturated, or aromatic, carbon-based ring; an optionally substituted, saturated or unsaturated heterocycle; alkoxycarbonyl or aryloxycarbonyl (—COOR), carboxyl (COOH); acyloxy (—O$_2$CR), carbamoyl (—CONR$_2$), cyano (—ON); alkylcarbonyl; alkylarylcarbonyl; arylcarbonyl; arylalkylcarbonyl; phthalimido; maleimido; succinimido; amidino; guanidimo; hydroxyl (—OH); amino (—NR$_2$); halogen; allyl; epoxy; alkoxy (—OR), S-alkyl; S-aryl groups; groups of hydrophilic or ionic nature such as the alkali metal salts of carboxylic acids, the alkali metal salts of sulphonic acid, polyalkylene oxide (PEO or PPO) chains and cationic substituents (quaternary ammonium salts); and

[A] represents a polymer chain;

(2) at least one free-radical polymerization initiator, and (3) at least one ethylenically unsaturated monomer (m) of n-alkyl(meth)acrylate, with n being of at least 6, typically, of more than 8, as described here-above, wherein the aqueous medium (M) includes water and optionally at least one water miscible solvent.

The step (E) may be typically performed in batch or semi-batch.

The step (E) is generally implemented without any surfactant in addition to the pre-polymer (p0) and the monomers (m). In this case, the emulsion polymerization of hydrophobic monomers (m) can be performed directly in batch ab initio conditions using pre-polymer (p0) soluble in the specific medium (M). Amphiphilic block copolymers thereby form and self-assemble into self-stabilized dispersions within the course of the polymerization by polymerization-induced self-assembly (PISA).

In other words, dispersions according to the instant invention are made via a macro-molecular self-assembly of polymeric emulsifier particles.

In some specific cases, the use of surfactants may be contemplated in step (E) (even if not compulsory, it may be of interest in some cases, to add surfactant in addition to the pre-polymer (p0) and the monomers (m), depending on the final application intended for the dispersion). The surfactants may be chosen from, but not limited to, ionic, non-ionic and amphoteric surfactants, such as fatty alcohols or alkylphenol sulfates or sulfonates, alkylbenzene sulfonates, for example, dodecylbenzene sulfonate, sulfosuccinates, quaternary ammonium salts or ethylated fatty alcohol. Some other surfactants can be contemplated, such as polyvinyl alcohols or poly N-vinyl pyrrolidone.

In the case that additional surfactants are used in step (E), it is preferably present in low concentration. Typically, from 0.1 to 10% of surfactant may be used, preferably, from 0.5 to 8, and advantageously from 1 to 5% by weight based on the total weight of the dispersion.

In the scope of the invention, the polymerisation is performed in a specific hydrophilic medium, comprising water and a water miscible solvent. The inventors have found that such solvent does not affect the mechanism implied by the PISA process.

According to an advantageous aspect of the present description, the solvent may be selected from solvents imparting significant antifreeze properties to the obtained polymer dispersions, preferably a glycol.

The process as defined above allows obtaining polymer dispersions with relatively low viscosity, high content (typically more than 30% by weight based on the total weight of the dispersion) in a specific medium. Without wishing to be related to any theory, this contributes to the stability of the dispersions, especially at low temperature.

These dispersions prepared by the PISA process present long term stability to creaming, coagulation or sedimentation, and are compatible with suitable additives such as corrosion inhibitors.

Furthermore, these dispersions exhibit an especially good stability at wide range, for example, from −20° C. to 20° C., 40° C., 50° C. or more.

In cases where the final application does not require specifically the stability of the dispersion, the step (E) can be carried out in other conditions than the PISA process descried here-above, in those cases, it can be prepared for example by more usual polymerization in emulsion process.

The Polymer Chain [A]

The polymer chain [A] is selected in order to impart the required solubility for pre-polymer (p0) in the medium (M). The exact nature of this polymer chain may vary to quite a large extent and it can be adjusted, case by case, according to the medium (M) used. The type of wax inhibitor composition into which it is desired to introduce the polymer of the dispersion should also be considered.

Typically, the polymer chain [A] can, be selected from the homo- and copolymers (random, gradient or block) resulting from the polymerization of at least one monomer ($mA_h$) selected from:

unsaturated carboxylic acid amides, such as acrylamide, methacrylamide, N-methylolacrylamide or -methacrylamide, N-alkyl(meth)acrylamides, N,N-dimethyl(meth)acrylamide, N,N-dimethylaminomethyl(meth)acrylamide, 2-(N,N-dimethylamino)ethyl(meth)acrylamide, 3-(N,N-dimethylamino)propyl(meth)acrylamide, or 4-(N,N-dimethylamino)butyl(meth)acrylamide, vinylamine amides, in particular vinylformamide, vinylacetamide, N-vinylpyrrolidone and N-vinylcaprolactam, $\alpha,\beta$ monoethylenically unsaturated amino esters, such as 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate, or 2-(diethylamino)ethyl methacrylate, vinylpyridines, vinylimidazolines, ethylenically unsaturated monocarboxylic and dicarboxylic acids, such as acrylic acid, methacrylic acid, itaconic acid, maleic acid or fumaric acid, monomers carrying at least one vinyl phosphonate function, such as vinylphosphonic acid, vinylphosphonic acid dimethyl ester, vinylphosphonic acid bis(2-chloroethyl) ester, vinylidenediphosphonic acid, vinylidenediphosphonic acid tetraisopropyl ester or alpha-styrenephosphonic acid, or mixtures thereof, mixtures of two or more of these monomers, ammoniumacryloyl or acryloyloxy monomers, trimethylammoniumpropylmethacrylate salts, in particular the chloride, trimethylammoniumethylacrylamide or -methacrylamide chloride or bromide, trimethylammoniumbutylacrylamide or -methacrylamide methylsulfate, trimethylammoniumpropylmethacrylamide methylsulfate (MAPTA MeS), (3-methacrylamidopropyl)trimethylammonium chloride (MAPTAC), (3-acrylamidopropyl)trimethylammonium chloride or methylsulfate (APTAC or APTA MeS), alkyl-polyalkoxylated (meth)acrylates that comprise one linear or branched (C5-C40)alkyl-polyethoxylated group, more typically (C10-C22)alkyl-polyethoxylated group per molecule, such as decyl-polyethoxylated (meth)acrylates, tridecyl-polyethoxylated (meth)acrylates, myristyl-polyethoxylated (meth)acrylates, cetyl-polyethoxylated (meth)acrylates, stearyl-polyethoxylated (methyl)acrylates, eicosyl-polyethoxylated (meth)acrylates, behenyl-polyethoxylated (meth)acrylates, even more typically decyl-polyethoxylated methacrylates, tridecyl-polyethoxylated methacrylates, myristyl-polyethoxylated methacrylates, cetyl-polyethoxylated methacrylates, stearyl-polyethoxylated methylacrylates, eicosyl-polyethoxylated methacrylates, behenyl-polyethoxylated methacrylates, and mixtures thereof, methacryloyloxyethyltrimethylammonium chloride or methylsulfate, acryloyloxyethyltrimethylammonium (ADAMQUAT) salts, such as acryloyloxyethyltrimethylammonium chloride or acryloyloxyethyltrimethylammonium methylsulfate (ADAMQUAT Cl or ADAMQUAT MeS), methyldiethylammoniumethyl acrylate methylsulfate (ADAEQUAT MeS), benzyldimethylammoniumethyle acrylate chloride or methylsulfate (ADAMQUAT BZ 80), 1-ethyl 2-vinylpyridinium bromide, chloride or methylsulfate or 1-ethyl 4-vinylpyridinium bromide, chloride or methylsulfate, N,N-dialkyldiallylamine monomers, such as N,N-dimethyldiallylammonium chloride (DADMAC), dimethylaminopropylmethacrylamide, N-(3-chloro-2-hydroxypropyl)trimethylammonium chloride (DIQUAT chloride), dimethylaminopropylmethacrylamide, N-(3-methylsulfate-2-hydroxypropyl)-trimethylammonium methylsulfate (DIQUAT methylsulfate), the monomer of formula

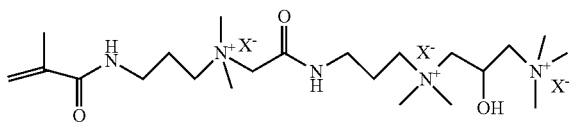

so where $X^-$ is an anion, preferably chloride or methylsulfate,

Alternatively, the hydrophilic monomers ($mA_h$) may comprise monomers selected from:

esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol(meth)acrylates;

α,β-ethylenically unsaturated monocarboxylic acid amides and the N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)acrylamide, and metholylacrylamide (acrylamide and N,N-dimethyl(meth)acrylamide prove to be in particular advantageous);

N-vinyllactams and derivatives thereof, for example N-vinylpyrrolidone and N-vinylpiperidone, open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;

esters of α,β-ethylenically unsaturated monocarboxylic and dicarboxylic acids with aminoalcohols, for example N,N-dimethylaminomethyl(meth)acrylate, N,N-dimethylaminoethyl(meth)acrylate, N, N-diethylaminoethyl acrylate, and N,N-dimethylaminopropyl (meth)acrylate, amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide and N-[4-(dimethylamino)butyl]methacrylamide;

ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, methallylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid (AMPS), vinylphosphonic acid, α-methylvinylphosphonic acid and allylphosphonic acid and/or their salts;

N-diallylamines, N,N-diallyl-N-alkylamines, acid-addition salts thereof and quaternization products thereof, the alkyl used here preferentially being 01-C3-alkyl;

N, N-diallyl-N-methylamine and N, N-diallyl-N, N-dimethylammonium compounds, for example the chlorides and bromides;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;

sulfobetaines; and mixtures and combinations of two or more of the above-mentioned monomers.

According to a preferred embodiment of the instant invention, the polymer chain [A] is selected from the homo- and copolymers (random, gradient or block) resulting from the polymerization of at least one monomer ($mA_h$) selected from:

ethylenically unsaturated monocarboxylic and dicarboxylic acids, such as acrylic acid, methacrylic acid, itaconic acid, maleic acid or fumaric acid, unsaturated carboxylic acid amides, such as acrylamide, methacrylamide, N-methylolacrylamide or -methacrylamide, N-alkyl(meth)acrylamides, N,N-dimethyl(meth)acrylamide, N,N-dimethylaminomethyl(meth)acrylamide, 2-(N,N-dimethylamino)ethyl(meth)acrylamide, 3-(N,N-dimethylamino)propyl(meth)acrylamide, or 4-(N, N-dimethylamino)butyl(meth)acrylamide, vinylamine amides, in particular vinylformamide, vinylacetamide, N-vinylpyrrolidone and N-vinylcaprolactam.

According to the present description, the term "(meth)acrylate" refers collectively and alternatively to the acrylate and methacrylate and the term "(meth)acrylamide" refers collectively and alternatively to the acrylamide and methacrylamide, so that, for example, "butyl (meth)acrylate" means butyl acrylate and/or butyl methacrylate.

According to an advantageous embodiment, polymer chain [A] is a polymer chain resulting from the polymerization of monomers (mA$_h$) only, provided that the pre-polymer (p0) remains soluble in the medium (M).

According to another specific embodiment, the polymer chain [A] comprises some units which are hydrophobic in nature, provided that the pre-polymer (p0) remains, overall, soluble in the medium (M). In that case, the polymer chain [A] generally results from a copolymerization (random or block) of a hydrophilic or amphiphilic monomer (mAh) as defined above and a hydrophobic monomer (mAH).

Said hydrophobic monomers (mA$_H$) including for example styrene or its derivatives, butadiene, ethylene, chloroprene, (meth)acrylic esters, vinyl esters of a carboxylic acid, for instance vinyl acetate, vinyl versatate or vinyl propionate, and vinyl nitriles.

The term "(meth)acrylic esters" denotes esters of acrylic acid and of methacrylic acid with hydrogenated or fluorinated $C_1$-$C_{12}$ and preferably $C_1$-$C_8$ alcohols. Among the compounds of this type that may be mentioned are: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate, isobutyl methacrylate, polyethyleneglycol acrylate or methacrylate with 4 to 50 units of ethylene glycol or methoxypolyethyleneglycol acrylate or methacrylate with 4 to 50 units of ethylene glycol.

The vinyl nitriles more particularly include those containing from 3 to 12 carbon atoms, such as, in particular, acrylonitrile and methacrylonitrile.

It should be noted that the styrene may be totally or partially replaced with derivatives such as α-methylstyrene or vinyltoluene.

Other ethylenically unsaturated monomers (mA$_H$) that may be used, alone or as mixtures, or that are copolymerizable with the above monomers are especially:
vinyl halides,
vinylamine amides, especially vinylformamide or vinylacetamide,
N'-alkyl(meth)acylamides of at least C8, N',N'-dialkyl (meth)acrylamides of at least C6.

It should moreover be noted that the polymer chain [A] of the pre-polymer (p0) has more particularly a number-average molar mass of less than 50 000 g/mol, for example, less than 20 000 g/mol, and more than 500 g/mol. Typically, the polymer chain [A] has a number-average molar mass between 1 000 and 10 000 g/mol. Preferably, the polymer chain [A] has a molar mass between 2 000 and 5 000 g/mol. These number-average molar masses can be for example measured by size exclusion chromatography, using polyethylene glycol as standard or triple detection (GPC).

The Pre-Polymer (p0)

The pre-polymer (p0) is "soluble in a medium (M)" which means that the pre-polymer may be solubilized in the medium (M) without phase separation on the macroscopic scale at the pre-polymer concentration used in step (E), in the absence of the monomer (m). Concretely, the pre-polymer (p0) is solubilized in medium (M) at the beginning of step (E). To this end, the polymer chain [A] included in the pre-polymer (p0) is soluble in the medium (M).

The pre-polymer (p0) of invention may typically be obtained by a preparation step)(E$^0$) of controlled radical polymerization of a composition comprising:
monomers containing (and usually consisting of) identical or different (generally identical) monomers (mA$_h$) as defined above, optionally together with at least one monomer (mA$_H$) as defined above;
a radical polymerization control agent including a group $(R^{11})_x$—$Z^{11}$—C(=S)—$Z^{12}$—, wherein $R^{11}$, x, $Z^{11}$, and $Z^{12}$ being defined above, (preferably xanthate, dithiocarbamate, dithiocarbazate, trithiocarbonate, dithioester or dithiobenzoate); and
a free-radical polymerization initiator which is typically as defined here-after.

The group $(R^{11})_x$—$Z^{11}$—C(=S)—$Z^{12}$— of pre-polymer (p0), which may especially be a thiocarbonylthio group, is typically introduced via the control agent used in the controlled radical polymerization performed in the above-mentioned step)(E$^0$), which is typically a RAFT or MADIX control agent. According to a specific embodiment, the control agent used in step)(E$^0$) may contain serval groups of this type (for example several thiocarbonylthio groups).

The radical polymerization control agent used in step)(E$^0$) may especially have the formula (F) below:

in which:
$R^{11}$, x, $Z^{11}$, and $Z^{12}$ being defined above for pre-polymer (p0); and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain.

R1, when substituted, may be substituted with optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O2CR), carbamoyl (—CONR2), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR2), halogen, perfluoroalkyl CnF2n+1, allyl, epoxy, alkoxy (—OR), S-alkyl, S-aryl, groups of hydrophilic or ionic nature such as alkali metal salts of carboxylic acids, alkali metal salts of sulfonic acid, polyalkylene oxide chains (PEO, PPO), cationic substituents (quaternary ammonium salts), R representing an alkyl or aryl group, or a polymer chain.

According to one particular embodiment, $R_1$ is a substituted or unsubstituted, preferably substituted, alkyl group.

The optionally substituted alkyl, acyl, aryl, aralkyl or alkyne groups to which reference is made in the present description generally contain 1 to 20 carbon atoms, preferably 1 to 12 and more preferentially 1 to 9 carbon atoms. They may be linear or branched. They may also be substituted with oxygen atoms, in particular in the form of esters or sulfur or nitrogen atoms.

Among the alkyl radicals, mention may be made especially of methyl, ethyl, propyl, butyl, pentyl, isopropyl, tert-butyl, pentyl, hexyl, octyl, decyl or dodecyl radicals.

For the purposes of the present description, the alkyne groups are radicals generally containing from 2 to 10 carbon atoms, and contain at least one acetylenic unsaturation, such as the acetylenyl radical.

For the purposes of the present description, the acyl groups are radicals generally containing from 1 to 20 carbon atoms with a carbonyl group.

Among the aryl radicals which may be used according to the invention, mention may be made in particular of the phenyl radical, optionally substituted especially with a nitro or hydroxyl function.

Among the aralkyl radicals, mention may be made in particular of the benzyl or phenethyl radical, optionally substituted especially with a nitro or hydroxyl function.

When $R_1$ is a polymer chain, this polymer chain may be derived from a radical or ionic polymerization or derived from a polycondensation.

Advantageously, in step)($E^0$), the radical polymerization control agent is a xanthate compound, for instance O-ethyl-S-(1-methoxycarbonyl ethyl) xanthate of formula $(CH_3CH(CO_2CH_3))S(C=S)OCH_2CH_3$.

A control agent that is particularly suited to the implementation of step)($E^0$) is the compound sold by the company Solvay under the name Rhodixan® A1.

The molecular weights (Mn) of the pre-polymer (p0) is typically from 1 000 to 100 000 g/mol, for example between 2 000 to 50 000 g/mol and in particular between 2500 to 10 000 g/mol.

The Free-Radical Polymerization Initiator Any source of free radicals which is known per se as being suitable for polymerization processes in a medium comprising water miscible solvent may be used in steps ($E^0$) and (E) of the polymerization of the invention.

The radical polymerization initiator may, for example, be selected from the following initiators:

peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-méthyl-N-hydroxyethyl)propionamide, 2,2'-azobis(N,N'-dimethyleneisobutyramidine)dichloride, 2,2'-azobis(2-amidinopropane)dichloride, 2,2'-azobis(N,N'-diméthyleneisobutyramide), 2,2'-azobis (2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide)dihydrate, redox systems comprising combinations such as:

mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars, alkali metal or ammonium persulfates, perborate or perchlorate in combination with an alkali metal bisulfite, such as sodium metabisulfite, and reducing sugars, and alkali metal persulfates in combination with an arylphosphinic acid, such as benzenephosphonic acid and the like, and reducing sugars.

According to one advantageous embodiment, use may be made of a radical initiator of redox type, which has the advantage of not requiring specific heating of the reaction medium (no thermal initiation). It is typically a mixture of at least one medium soluble oxidizing agent with at least one medium soluble reducing agent.

The oxidizing agent present in the redox system may be selected, for example, from peroxides such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or potassium bromate.

The reducing agent present in the redox system may typically be selected from sodium formaldehyde sulfoxylate (in particular in dihydrate form, known under the name Rongalit, or in the form of an anhydrite), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:

mixtures of water-soluble persulfates with water-soluble tertiary amines, mixtures of water-soluble bromates (for example alkali metal bromates) with water-soluble sulfites (for example alkali metal sulfites), mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars, alkali metal or ammonium persulfates, perborate or perchlorate in combination with an alkali metal bisulfite, such as sodium metabisulfite, and reducing sugars, and alkali metal persulfates in combination with an arylphosphinic acid, such as benzenephosphonic acid and the like, and reducing sugars.

An advantageous redox system comprises (and preferably consists of) for example a combination of ammonium persulfate and sodium formaldehyde sulfoxylate.

The Aqueous Medium (M)

The water is preferably present in the medium (M) in an amount of at least 50% by weight, preferably at least 60% by weight based on the total weight of the aqueous medium.

The water miscible solvent is preferably present in the medium (M) in an amount of at least 15% by weight of the total weight of the medium, for example between 20 and 50%, for example, at least 25%, or at least 30%, e.g. between 25 and 40% by weight.

In some cases, the water miscible solvent may however be present in the medium (M) in an amount of more than 40% by weight of the total weight of the medium, for example, at least 45%, preferably 50% or more, possible up to 100%.

Suitable water miscible solvents include saturated or unsaturated monohydric alcohols and polyhydric alcohols, as well as alkylether diols such as, for example, methanol, ethanol, isopropanol, cetyl alcohol, benzyl alcohol, oleyl alcohol, 2-butoxyethanol, glycol, such as, for example, ethylene glycol, polyethylene glycol, propylene glycol, hexylene glycol, ethylene glycol monoethyl ether, ethylene glycol mono n-butyl ether (EGMBE), propylene glycol monoethyl or and diethylene glycol monomethyl ether.

According to one embodiment of the invention, the water miscible solvent is preferably a glycol, for example, monoethylene glycol, propylene glycol and/or tripropylene glycol, and/or ethylene glycol mono n-butyl ether (EGMBE).

The Polymer Dispersion

According to the present description, "polymer dispersion" denotes a composition comprising a polymer in the form of microscopically observable particles having dimensions between 100 nm and 1 microns (most commonly between 200 nm and 800 nm, and typically between 200 and 600 nm) dispersed within a phase consisting of a medium as defined above. A dispersion of polymers, within the meaning given to the term as used in the present description, should be distinguished from a solution of polymers, which does not contain polymers in the form of microscopically observable particles. Typically, the dispersion has a milky appearance and widely scatters light, whereas a solution usually has a transparent appearance.

The medium (M) of the present invention is used as a liquid carrier, typically presents as a continuous phase, and comprising at least one water miscible solvent, typically glycol, and optionally salts or else water-soluble compounds.

According to a specific embodiment, the step (E) may be a copolymerization step using co-monomers (m') as described here-above in addition to one or more monomers (m).

In some specific case, the step (E) may be a copolymerization step using one or more monomers (m), co-monomers (m') as described here-above in addition to hydrophilic monomers as defined here-above for monomer ($mA_h$), and/or mixture thereof.

These co-monomers (m') may be chosen depending on the specific use of the polymer dispersion of the invention. Typically, the ratio by weight (m)/(m') of the monomer(s) (m) to the co-monomer(s) (m') present in the polymer dispersion is at least 50:50, for example at least 55:45, e.g. at least 60:40 or 75:25 in some cases.

According to one embodiment of the invention, at least one kind of monomers is used in the medium (M) to form a homopolymer.

According to one embodiment of the invention, at least two monomers (namely two kinds of monomers) are used to form a random, gradient or block copolymer.

Typically, the ratio by weight between the pre-polymer (p0) and the monomer (m) is between 2 to 50%, preferably between 5 to 30%, for example between 5 to 25%.

The following examples are presented for purposes of illustration and are not intended to limit the scope of this invention.

EXAMPLES

The following examples made use of an aqueous solution of pre-polymer called "P-Xa" prepared as follows:

P1-Xa

In a 2 L double jacketed reactor, equipped with a condenser, a mechanical stirrer, a thermal probe and a nitrogen inlet, one introduced 140.68 g of deionized water, 78.15 g of ethanol, 18.74 g of Rhodixan A1, and 67.50 g of dimethylacrylamide. The mixture was deoxygenated by nitrogen bubbling for 30 minutes. Then the mixture was heated to 40° C. in 30 minutes. When the temperature into the reactor reached 40° C., 11.13 g of an aqueous solution of ammonium persulfate at 10 wt % and 3.12 g of an aqueous solution of sodium formaldehyde sulfoxilate at 0.65 wt % were added shotwise. Then 908 g of an aqueous solution of dimethylacrylamide at 42 wt % was added for 180 minutes, and 24.50 g of an aqueous solution of sodium formaldehyde sulfoxilate at 0.75 wt % was added for 300 minutes. After the end of the introduction of NaFS, the mixture was heated to 40° C. for 3 hours.

The poly(dimethylacrylamide)-Xa ("P1-Xa") was obtained at the end of the reaction.

P2-Xa

In a 500 mL double jacketed reactor, equipped with a condenser, a mechanical stirrer, a thermal probe and a nitrogen inlet, one introduced 37.2 g of deionized water, 23.26 g of ethanol, 5.36 g of Rhodixan A1, 17.2 g of dimethylacrylamide and 4.18 g of AMPS at 50 wt % in water. The mixture was deoxygenated by nitrogen bubbling for 30 minutes. Then the mixture was heated to 40° C. in 30 minutes. When the temperature into the reactor reached 40° C., 3.17 g of an aqueous solution of ammonium persulfate at 10 wt % and 0.78 g of an aqueous solution of sodium formaldehyde sulfoxilate at 0.65 wt % were added shotwise. Then 298 g of an aqueous solution of dimethylacrylamide (112 g) and AMPS (27 g at 50 wt %) was added for 180 minutes, and 10.48 g of an aqueous solution of sodium formaldehyde sulfoxilate at 0.75 wt % was added for 300 minutes. After the end of the introduction of NaFS, the mixture was heated to 40° C. for 3 hours.

The poly(DMA-co-AMPS)-Xa ("P2-Xa") was obtained at the end of the reaction.

P3-Xa

In a 500 mL double jacketed reactor, equipped with a condenser, a mechanical stirrer, a thermal probe and a nitrogen inlet, one introduced 39.3 g of deionized water, 23.26 g of ethanol, 5.36 g of Rhodixan A1 and 19.52 g of dimethylacrylamide. The mixture was deoxygenated by nitrogen bubbling for 30 minutes. Then the mixture was heated to 40° C. in 30 minutes. When the temperature into the reactor reached 40° C., 3.17 g of an aqueous solution of ammonium persulfate at 10 wt % and 0.78 g of an aqueous solution of sodium formaldehyde sulfoxilate at 0.65 wt % were added shotwise. Then 207 g of an aqueous solution of dimethylacrylamide at 66 wt % was added for 144 minutes, and 13.98 g of an aqueous solution of sodium formaldehyde sulfoxilate at 0.75 wt % was added for 300 minutes. After the end of the introduction of the aqueous solution of DMA, 90.08 g of an aqueous solution of dimethylacrylamide (21.88 g) and AMPS (32.06 g at 50 wt %) was added for 36 minutes. After the end of the introduction of NaFS, the mixture was heated to 40° C. for 3 hours.

The PDMA-b-poly(DMA-co-AMPS)-Xa ("P3-Xa") was obtained at the end of the reaction.

Example 1—Dispersion 1

In a 2 L double jacketed reactor, equipped with a condenser, a mechanical stirrer, a thermal probe and a nitrogen inlet, one introduced 288 g of deionized water, 476 g of tripropylene glycol, 345 g of an aqueous solution of P1-Xa at 38 wt %, 5.23 g of dodecylbenzene sulfonate and 523 g of stearyl acrylate. The mixture was deoxygenated by nitrogen bubbling for 30 minutes. Then the mixture was heated to 70° C. When the temperature into the reactor reached 70° C., 3.73 g of sodium persulfate solubilized in a minimum amount of water was added shotwise. The mixture was then heated to 70° C. for 8 hours.

After filtration over 45 μm, one obtained a stable dispersion 1 with a solid content of 40 wt % on average.

Example 2—Dispersion 7

In a 500 mL double jacketed reactor, equipped with a condenser, a mechanical stirrer, a thermal probe and a nitrogen inlet, one introduced 40.92 g of deionized water, 75.12 g of tripropylene glycol, 54.18 g of an aqueous solution of P1-Xa at 36 wt %, 0.79 g of dodecylbenzene sulfonate and 79.04 g of stearyl acrylate. The mixture was deoxygenated by nitrogen bubbling for 30 minutes. Then the mixture was heated to 70° C. When the temperature into the reactor reached 70° C., 0.54 g of sodium persulfate solubilized in a minimum amount of water was added shotwise. The mixture was then heated to 70° C. for 8 hours.

After filtration over 45 μm, one obtained a stable dispersion 7 with a solid content of 40 wt % on average.

Example 3—Dispersion 14

In a 500 ml multinecked round bottom flask, equipped with a condenser, a mechanical stirrer, a thermal probe and a nitrogen inlet, were introduced 45.9 g of deionized water, 76 g of tripropylene glycol, 54.20 g of an aqueous solution of P1-Xa at 36.7 wt %, 0.79 g of dodecylbenzene sulfonate and 79.01 g of stearyl acrylate. The mixture was deoxygenated by nitrogen bubbling for 30 minutes. Then the mixture was heated to 70° C. When the temperature in the reactor reached 70° C., 0.564 g of sodium persulfate solubilized in a minimum amount of water was added shotwise. The mixture was then heated to 70° C. for 8 hours.

After filtration over 45 μm, a stable dispersion 14 was obtained with a solid content of 40 wt % on average.

Example 4—Dispersion 25

In a 500 mL double jacketed reactor, equipped with a condenser, a mechanical stirrer, a thermal probe and a nitrogen inlet, one introduced 120.73 g of deionized water, 130 g of tripropylene glycol, 13.57 g of an aqueous solution of P1-Xa at 39 wt % and 106 g of stearyl acrylate. The mixture was deoxygenated by nitrogen bubbling for 30 minutes. Then the mixture was heated to 70° C. When the temperature into the reactor reached 70° C., 0.15 g of sodium persulfate solubilized in a minimum amount of water was added shotwise. The mixture was then heated to 70° C. for 8 hours.

After filtration over 45 μm, one obtained a stable dispersion 25 with a solid content of 30 wt % on average.

Example 5—Dispersion 28

In a 500 mL double jacketed reactor, equipped with a condenser, a mechanical stirrer, a thermal probe and a nitrogen inlet, one introduced 63.98 g of deionized water, 119.5 g of tripropylene glycol, 84.50 g of an aqueous solution of P3-Xa at 37 wt % and 127.24 g of stearyl acrylate. The mixture was deoxygenated by nitrogen bubbling for 30 minutes. Then the mixture was heated to 70° C. When the temperature into the reactor reached 70° C., 0.90 g of sodium persulfate solubilized in a minimum amount of water was added shotwise. The mixture was then heated to 70° C. for 8 hours. After filtration over 45 μm, one obtained a stable dispersion 28 with a solid content of 40 wt % on average.

Example 6: Impact of Friction Reducer on Performance of PPD Dispersion

To simulate the field condition, both crude oil (25 mL, West Texas crude) and fresh water (25 mL, tap water of the Woodland, Tex.) were added to the testing jars of a cold-finger apparatus. The water bath of the cold-finger tester was set to 40° C., finger was set to 0° C., and samples were incubated for 4 h. Four batches of PPD dispersion (Dispersion7, Dispersion14, Dispersion25, Dispersion28 with different side carbon chain, and different backbone) were tested.

The dispersion was dosed to the crude oil at 500 ppm active concentration and friction reducer (FR-WH®, from Solvay) was dosed to the brine at 1000 ppm as product. Wax deposition testing results showed that the presence of FR-WH® did not inhibit the performance of the dispersion in inhibiting wax deposit formation comparing to the one without friction reducer in it. On the contrary, presence of FR-WH® stimulated performance of the dispersion (FIG. 1), indicating that the dispersion is still effective in the presence of friction reducer in fracturing fluids.

Example 7: Impact of PPD Dispersion on Friction Reducer Performance

Figure 2:
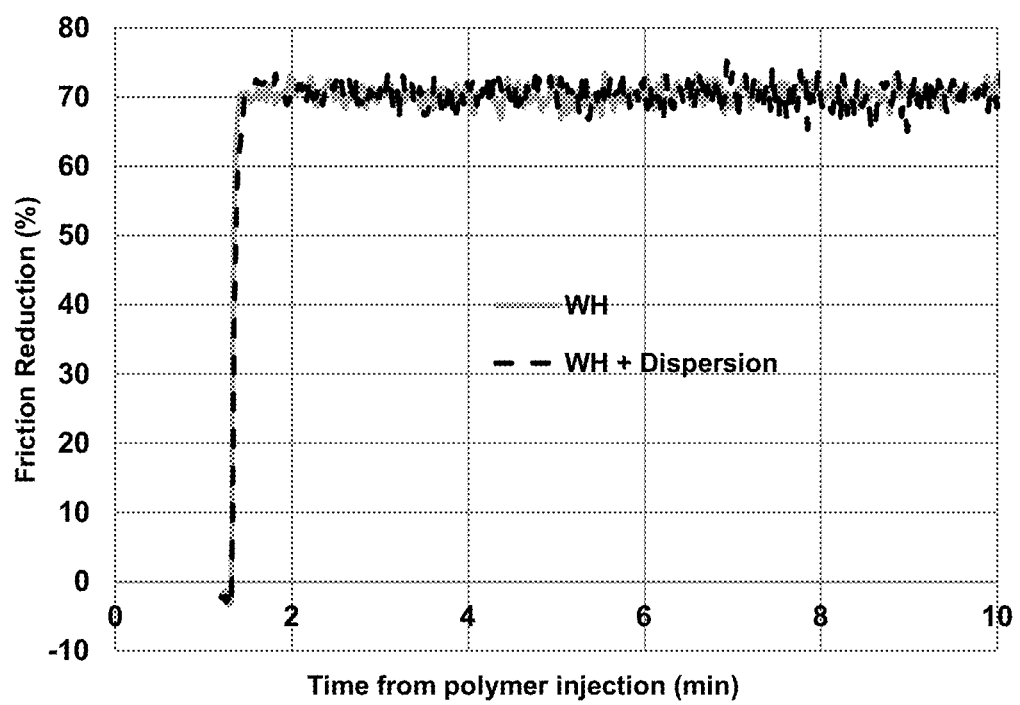
FIG. 2 shows the impact of PPD dispersion on a certain friction reducer in fresh water.

FR-WH® (1000 ppm as product) was tested for friction reduction in fresh water using a friction reduction flow loop in the absence/presence of the dispersion 1 (500 ppm as active). The loop was operated at 10 gallon/minute, and its pipe diameter is 0.57 inch. Results showed that there is no friction reduction performance difference between both tests (FIG. 2).

Figure 3:
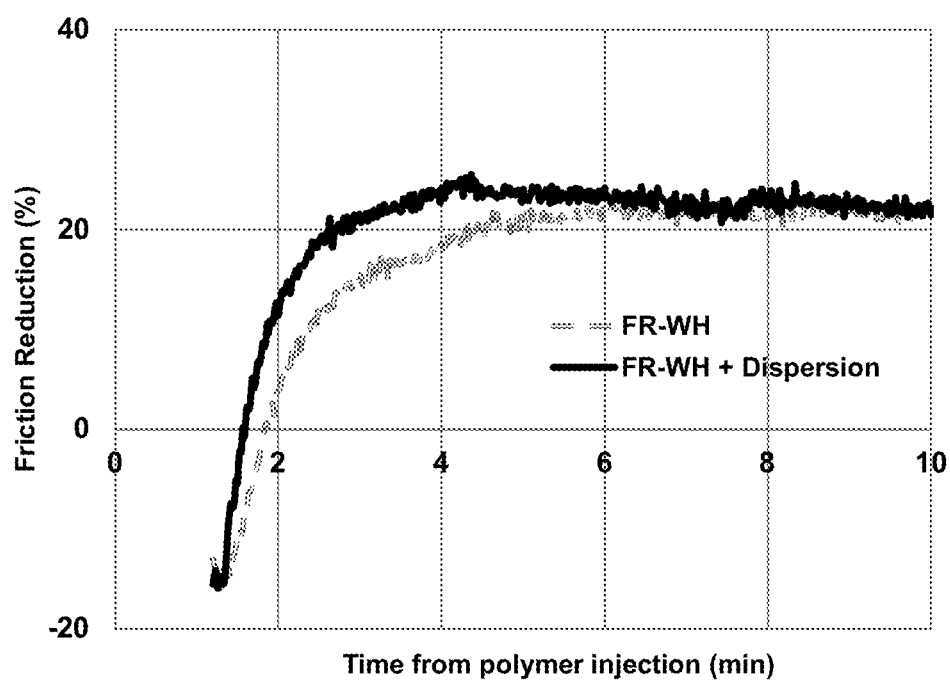
FIG. 3 shows the impact of PPD dispersion on a certain friction reducer in 100 k brine. Addition of inventive dispersion to the friction reducer (solid black line) showed improved performance compared to that of the friction reducer alone (hollow dashed line).

To verify this impact in brine system, FR-WH® (1000 ppm as product) was tested for friction reduction in 100 k brine (Ellen Burger) using the same flow loop at same condition in the absence/presence of the dispersion 1 (500 ppm as active). Results showed that dispersion did not inhibit performance of FR-WH®. On the contrary, the dispersion improved its performance, indicating a synergistic effect (FIG. 3).

The invention claimed is:

1. A process for stimulation treatment of a subterranean formation for recovering oil, said process comprising injecting into said formation an aqueous polymer dispersion comprising at least one polymer (P), whose monomer units include at least one monomer (m) of n-alkyl(meth)acrylate of C6 to C36, wherein the polymer dispersion is mixed with an aqueous fracturing fluid comprising a friction reducer before injection into the oil well, wherein the presence of the friction reducer improves a wax inhibition effect of the aqueous polymer dispersion.

2. The process according to claim 1, wherein the monomer (m) is chosen from an alkyl(meth)acrylate between C8 and C24.

3. The process according to claim 1, wherein the monomer (m) is chosen from iso-octyl (meth)acrylate, iso-bornyl (meth)acrylate, lauryl (meth)acrylate, octadecyl (meth)acrylate, 2-ethyl hexyl (meth)acrylate, C22 alkyl acrylate and/or a mixture thereof.

4. The process according to claim 1, wherein the polymer (P) comprises more than 50% and less or equal to 100% by weight of the monomer (m).

5. The process according to claim 1, wherein the polymer (P) comprise monomers units of one or more co-monomers (m') selected from n-alkyl(meth)acrylates with n less than or equal to 6.

6. The process according to claim 1, wherein the polymer (P) comprises monomer units of one or more hydrophilic monomers or amphiphilic (mA$_h$).

7. The process according to claim 1, wherein the polymer dispersion comprises from 1 to 80% by weight of the polymer (P).

8. The process according to claim 1, wherein the polymer dispersion comprises a water-miscible solvent or a mixture of solvents.

9. The process according to claim 8, wherein the water-miscible solvent or a mixture of solvents is selected from the group consisting of monoethylene glycol, propylene glycol and/or tripropylene glycol, and/or ethylene glycol mono n-butyl ether (EGMBE).

10. The process according to claim 1, wherein the polymer dispersion comprises from 0 to 10% by weight of one or more surfactants.

11. The process according to claim 10, wherein the surfactant is chosen from fatty alcohols or alkylphenol sulfates or sulfonates, alkylbenzene sulfonates, sulfosuccinates, quaternary ammonium salts, dimethyldialkylammonium chloride or ethylated fatty alcohol.

12. The process according to claim 1, wherein the friction reducer compound is a polyacrylamide based (co)polymer.

13. The process according to claim 1, wherein the polymer dispersion is impregnated into a solid particle before introduction into the subterranean formation, wherein the solid particle comprises a porous material or an adsorbent or an absorbent material or a mixture thereof.

14. The process according to claim 13, wherein the adsorbent material is a porous proppant particle.

15. The process according to claim 13, wherein the adsorbent material is chosen from the group consisting of activated carbon and/or coals, silica particulates, precipitated silicas, silica (quartz sand), alumina, silica alumina, silicate, calcium silicate, sand, bauxite, kaolin, talc, zirconia, boron and glass, fly ash, zeolites, diatomaceous earth, ground walnut shells, and fuller's earth.

16. The process according to claim 1, wherein the polymer dispersion is prepared by a process comprising a step (E) of free radical polymerization in an aqueous medium (M) in the presence of: (1) at least a pre-polymer (p0) of formula (I), soluble in the medium (M):

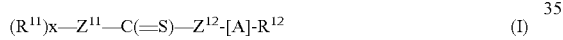

(R$^{11}$)x—Z$^{11}$—C(=S)—Z$^{12}$-[A]-R$^{12}$     (I)

wherein:
Z$^{11}$ represents C, N, O, S or P,
Z$^{12}$ represents S or P,
R$^{11}$ and R$^{12}$, which may be identical or different, represent:
an optionally substituted alkyl, acyl, aryl, alkene or alkyne group (i), or
a saturated or unsaturated, optionally substituted or aromatic carbon-based ring (ii), or
a saturated or unsaturated, optionally substituted heterocycle (iii), these groups and rings (i), (ii) and (iii) possibly being substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups of hydrophilic or ionic nature,
R representing an alkyl or aryl group,
x corresponds to the valency of Z$^{11}$, or alternatively x is 0, in which case Z$^{11}$ represents a phenyl, alkene or alkyne radical, optionally substituted with an optionally substituted alkyl; acyl; aryl; alkene or alkyne group; an optionally substituted, saturated, unsaturated, or aromatic, carbon based ring; an optionally substituted, saturated or unsaturated heterocycle; alkoxycarbonyl or aryloxycarbonyl (—COOR); carboxyl (COOH); acyloxy (—O$_2$CR); carbamoyl (—CONR$_2$); cyano (—CN); alkylcarbonyl; alkylarylcarbonyl; phthalimido; maleimido; succinimido; amidino; guanidimo; hydroxyl (—OH); amino (—NR$_2$); halogen; allyl; epoxy; alkoxy (—OR), S-alkyl; S-aryl groups; groups of hydrophilic or ionic nature;
[A] represents a polymer chain;
(2) at least one free-radical polymerization initiator, and
(3) at least one ethylenically unsaturated monomer (m) of n-alkyl(meth)acrylate of C6 to C36,
wherein the aqueous medium (M) includes water and optionally at least one water miscible solvent.

17. The process according to claim 16, wherein the polymer chain [A] is selected from the homo- and copolymers (random, gradient or block) resulting from the polymerization of at least one monomer (mA$_h$) selected from:
ethylenically unsaturated monocarboxylic and dicarboxylic acids,
unsaturated carboxylic acid amides,
vinylamine amides.

18. The process according to claim 16, wherein the polymer chain [A] has a number-average molar mass of less than 50 000 g/mol and more than 500 g/mol.

19. The process according to claim 16, wherein the pre-polymer (p0) is obtained by a preparation step)(E$^0$) of controlled radical polymerization of a composition comprising:
monomers containing identical or different hydrophilic monomers (mA$_h$), optionally together with at least one hydrophobic monomer;
a radical polymerization control agent; and
a free-radical polymerization initiator.

20. The process according to claim 19, wherein the radical polymerization control agent is a xanthate, dithiocarbamate or dithiocarbazate.

21. The process according to claim 1, wherein the polymer dispersion is used for inhibiting wax formation.

* * * * *